United States Patent [19]
Rohm

[11] Patent Number: 5,236,206
[45] Date of Patent: Aug. 17, 1993

[54] DRILL CHUCK

[76] Inventor: Gunter H. Rohm, Heinrich-Rohm-Strasse50, D 7927 Sontheim, Fed. Rep. of Germany

[21] Appl. No.: 956,048

[22] Filed: Oct. 2, 1992

[30] Foreign Application Priority Data

Feb. 5, 1992 [DE] Fed. Rep. of Germany ........ 4203200
Jun. 13, 1992 [DE] Fed. Rep. of Germany ..... 92109964

[51] Int. Cl.$^5$ .............................................. B23B 31/12
[52] U.S. Cl. ...................................... 279/63; 279/60; 279/902
[58] Field of Search ..................... 279/63, 60, 61, 62, 279/125, 902

[56] References Cited

U.S. PATENT DOCUMENTS

| | | | |
|---|---|---|---|
| 3,545,776 | 12/1970 | Haviland | 279/902 X |
| 4,213,623 | 7/1980 | Röhm | 279/60 X |
| 4,773,667 | 9/1988 | Röhm | 279/19.1 |
| 4,836,563 | 6/1989 | Röhm | 279/63 |
| 4,913,449 | 4/1990 | Röhm | 279/63 X |
| 4,955,623 | 9/1990 | Röhm | 279/63 X |
| 5,054,796 | 10/1991 | Röhm | 279/63 X |
| 5,158,306 | 10/1992 | Röhm | 279/61 |

Primary Examiner—Timothy V. Eley
Attorney, Agent, or Firm—Herbert Dubno; Andrew Wilford

[57] ABSTRACT

A drill chuck has a body centered on and rotatable about an axis, a plurality of jaws radially displaceable on the body, an adjustment sleeve rotatable but not axially displaceable on the body and engaging the jaws for radially displacing same, and a locking ring rotatable on the body at most through a small acute angle and axially displaceable on the body between a freeing position and a locking position. The locking ring and adjustment sleeve are formed with axially interengageable teeth that are meshed in the locking position of the locking ring and that are out of engagement with each other in the freeing position of the locking ring. An actuating ring is rotatable but not axially displaceable on the body adjacent the locking ring. Angled formations between the rings couple same together for axial movement of the locking ring into its freeing position on rotation of the actuating ring in one rotational sense and for opposite axial movement of the locking ring into its locking position on rotation of the actuating ring in the opposite rotational sense.

20 Claims, 15 Drawing Sheets

DRILL CHUCK

FIELD OF THE INVENTION

The present invention relates to a drill chuck. More particularly this invention concerns a chuck that can be locked once tightened.

BACKGROUND OF THE INVENTION

A drill chuck such as described in U.S. Pat. No. 4,836,563 for use with a tool having a shaft typically has a chuck body centered on and rotatable about an axis and an adjustment body centered on the axis, rotatable about the axis on the chuck body, and axially fixed on the chuck body. One of the bodies is formed with a plurality of angularly equispaced jaw-guide passages centered on respective jaw axes all lying on the surface of an imaginary cone centered on the axis. The other of the bodies is formed with a screwthread centered on the axis and exposed in the guide passages. Respective jaws displaceable in the passages along the respective axes are each formed with a row of teeth meshing with the screwthread so that relative rotation of the bodies in one direction moves the jaws radially inward an axially forward and opposite relative rotation moves the jaws radially outward and axially rearward.

Such a chuck is often set up to be self-tightening by forming the passages in the adjustment body and is provided with a locking ring that is axially and limitedly angularly displaceable on the chuck body and engageable with teeth on the adjustment body to limit its rotation. As the chuck is used the torque imparted to it tends to screw down the jaws, tightening them on the tool.

In order that the locking ring not interfere with the self-tightening action, it is necessary that the locking ring be limitedly rotatable on the chuck to follow the rotation of the element that rotates as the chuck self tightens. Two end stops are provided as described in U.S. Pat. No. 4,773,657 and a spring arrangement that normally returns the locking ring to the so-called starting end position corresponding to the position from which it will move as the chuck self tightens. To this end the locking ring is formed with two axially extending short and long grooves and the chuck body has a head that projects into them. In one end position the head is in the long groove so that teeth on the front end of the locking ring engage the adjustment sleeve and prevent it from rotating and in the other position the head is in the short groove and the locking-ring and adjustment-sleeve teeth do not engage. The locking ring can be pulled back against the force of a spring to allow the position to be selected.

In German patent 3,093,443 of H. Mack a system is described where the jaws are carried by the adjustment sleeve. To establish the two end positions of the locking ring the chuck body has two axially extending planar surfaces confronting respective surfaces of the locking ring. Similarly, U.S. Pat. No. 4,836,563 has a system where the two end positions are established by a recess in the locking ring and a pin projecting into this recess and seated in the chuck body. Thus once again the locking ring can assume two angular end positions and two different axial positions.

With the known lockable self-tightening chucks it is essential that the locking ring be set in its starting end position. Otherwise the locking ring will inhibit self-tightening of the chuck. It is also of course essential that the locking ring be set in the position permitting it to move axially forward for locking action. Hence the locking ring must be exactly set each time a bit is fitted to the chuck to ensure both locking and self-tightening action. If the tool operator does not do this carefully, these functions of the chuck are lost.

OBJECTS OF THE INVENTION

It is therefore an object of the present invention to provide an improved drill chuck.

Another object is the provision of such an improved drill chuck which overcomes the above-given disadvantages, that is which automatically is set in the locking and starting position.

SUMMARY OF THE INVENTION

A drill chuck has according to the invention a body centered on and rotatable about an axis, a plurality of jaws radially displaceable on the body, an adjustment sleeve rotatable but not axially displaceable on the body and engaging the jaws for radially displacing same, and a locking ring rotatable on the body at most through a small acute angle and axially displaceable on the body between a freeing position and a locking position. The locking ring and adjustment sleeve are formed with axially interengageable teeth that are meshed in the locking position of the locking ring and that are out of engagement with each other in the freeing position of the locking ring. An actuating ring is rotatable but not axially displaceable on the body adjacent the locking ring. Angled formations between the rings couple same together for axial movement of the locking ring into its freeing position on rotation of the actuating ring in one rotational sense and for opposite axial movement of the locking ring into its locking position on rotation of the actuating ring in the opposite rotational sense.

Thus in order to lock the clutch the user turns the actuating ring in the locking sense, and vice versa to unlock it. This rotary action is intuitive, forming natural part of the dechucking/chucking operation. In a chuck that is not self-tightening the locking ring cannot turn appreciably on the chuck body while in a self-tightening unit there is considerable angular play. Furthermore, when adapted to a self-tightening chuck the formations are angled such that the rotation direction of the actuating ring to displace the locking ring into the locking position is opposite to a rotation direction of the sleeve on the body to move the jaws radially together. Thus when gripping the chuck to open it one will inherently back off the locking ring while twisting the adjustment sleeve in the opening direction. Twisting the actuating ring in the release direction automatically not only in this case pulls the locking ring into the freeing position, but also returns it to its starting position while opposite twisting of the actuating ring merely returns the locking ring to the axially forward locking position without moving it out of the angular starting position.

According to the invention the chuck body and locking ring have mutual axially extending and angularly engageable flats that can move between a position flatly engaging each other and a position forming with each other an angle corresponding to a self-adjustment takeup angle. Furthermore, the formations include a cam on one of the rings forming an angled ramp and a follower on the other of the rings riding on the ramp. The one ring is formed with an angled radially open groove forming the ramp and the other ring is provided with a radial projection engaged in the groove. More particularly the one ring is formed with a pair of such ramps extending parallel to each other but facing axially oppositely and the follower engages both ramps. The follower includes a respective roller engaging each ramp. It is also possible for the formation to include an external screwthread on one of the rings and an internal screwthread on the other ring. These screwthreads are multiple screwthreads and the external screwthread comprises a plurality of screwthread sections alternating angularly with thread-free lands. The ends of the screwthread sections are of the same pitch and are aligned with the adjacent screwthread sections. Such multiple screwthreads can convert considerable angular force into axial force and are particularly easy to machine in sections as described above.

The drill chuck according to the invention has means for releasably retaining the locking ring in its locking and freeing positions. This retainer includes a radially displaceable retaining element on one of the rings, a pair of axially offset radially open seats on the other ring in which the element is engageable, and a spring urging the element radially toward the seats. The element can be a split spring ring and the one ring is formed with a radially open groove in which the ring is seated. It can also be a radially displaceable pin in which case one of the seats is a radially inwardly open smooth-floored groove and the other of the seats is a row of radially open and axially extending notches. In this case the one ring is formed between the seats with an angled annular surface and the one ring has a plurality of such angularly spaced pins axially spaced by a distance substantially smaller than the distance through which the locking ring moves on displacement between its freeing and locking positions.

According to another feature of the invention operating the chuck in a non-self-tightening unit is eased by a grip ring on the actuating ring that directly engages and holds the locking ring. This grip ring is radially compressible, axially coupled to the actuating ring, and has an inner friction surface directly engageable with the locking ring. It is formed with axially oppositely open slots permitting it to be radially compressed.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

As seen in FIGS. 1 through 9 a drill chuck 1 centered on an axis 3 basically comprises a chuck body 6 formed with an axially rearwardly open hole by means of which it is mounted on an unillustrated drill spindle. An adjustment sleeve 5 rotatable about the axis 3 on the body 1 is formed with three angled guide passages 4 angularly equispaced about the axis 3 and each slidably receiving a respective jaw 2 having an inner edge formed with a row of teeth 7 meshing with a screwthread 11 formed on a frustoconical surface of the body 6. The chuck body 6 is formed with a radially outwardly projecting ridge 9 bearing axially forwardly via balls 8 on a ring 11 fixed on the sleeve 5 and axially rearwardly via further such balls 8 on a ring 10 fixed to the sleeve 5. Thus this sleeve 5 can rotate on the body 6 but cannot move axially relative to it. Rotation of the sleeve 5 in one direction relative to the body 6 will move the jaws 2 axially forward and radially inward and opposite rotation will move them oppositely.

Figure 4:
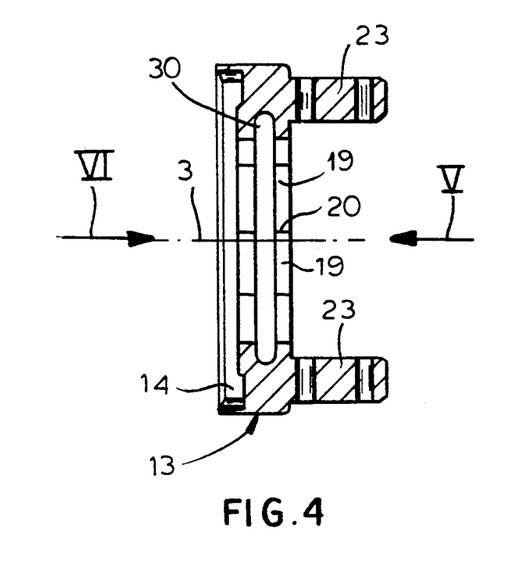
FIG. 4 is an axial section through the locking ring of the FIG. 1 chuck.
Figure 5:
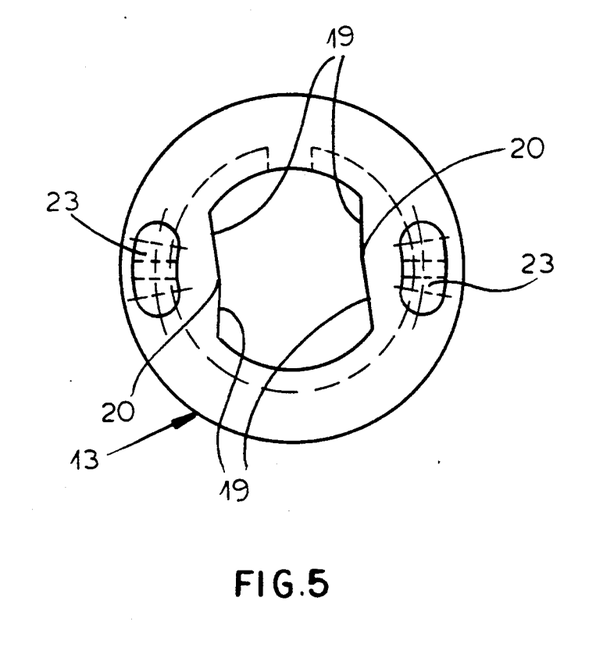
FIGS. 5 and 6 are axial end views taken in the directions of respective arrows V and VI of FIG. 4.
Figure 6:
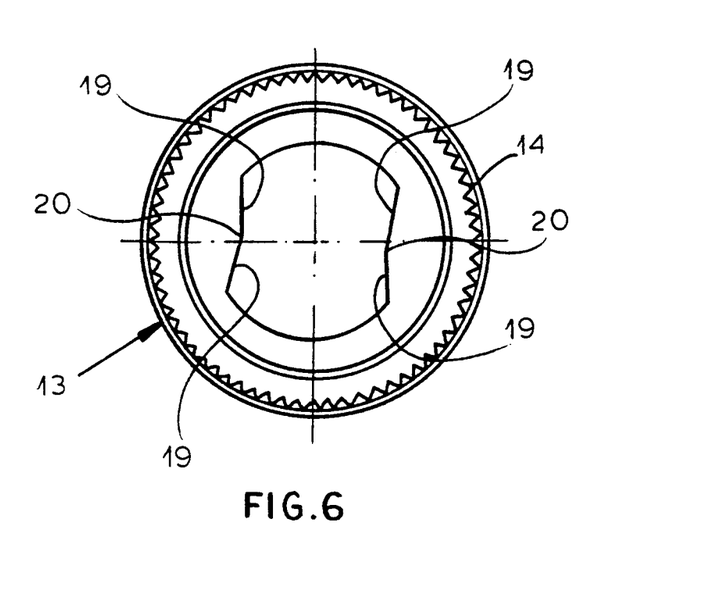
Figure 7:
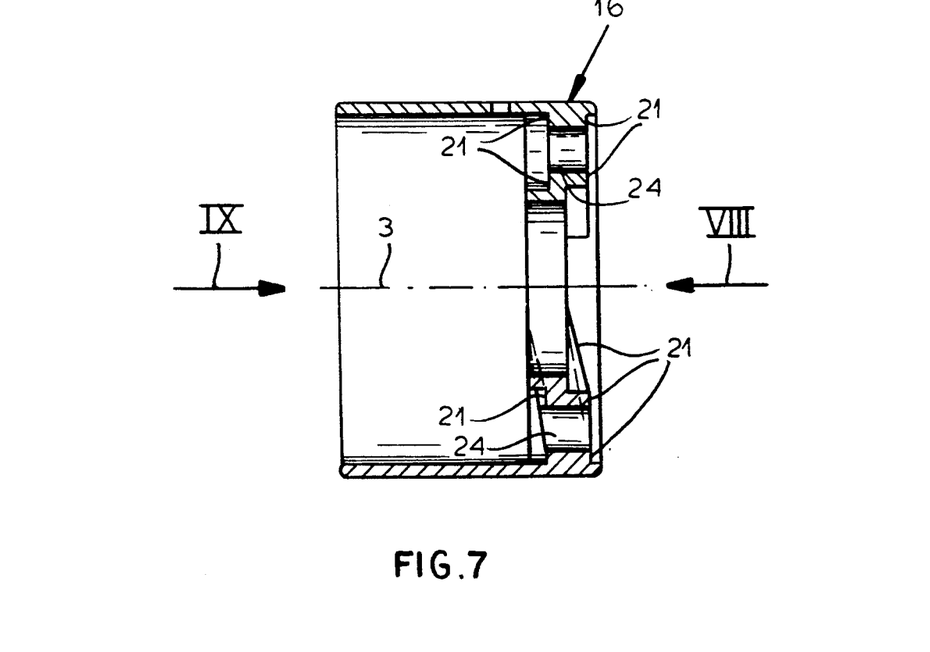
FIG. 7 is an axial section through the actuating ring of the FIG. 1 chuck.
Figure 8:
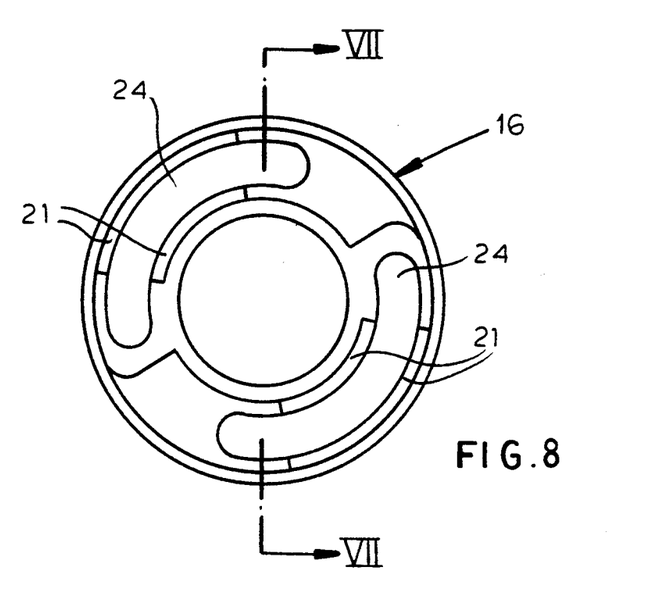
FIGS. 8 and 9 are axial end views taken in the directions of respective arrows VIII—VIII and IX—IX of FIG. 7, line VII—VII of FIG. 8 being the section line for FIG. 7.
Figure 9:
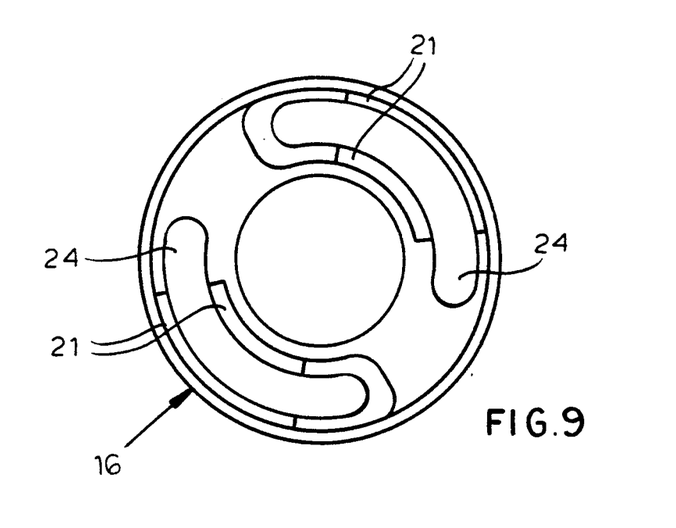
Figure 10:
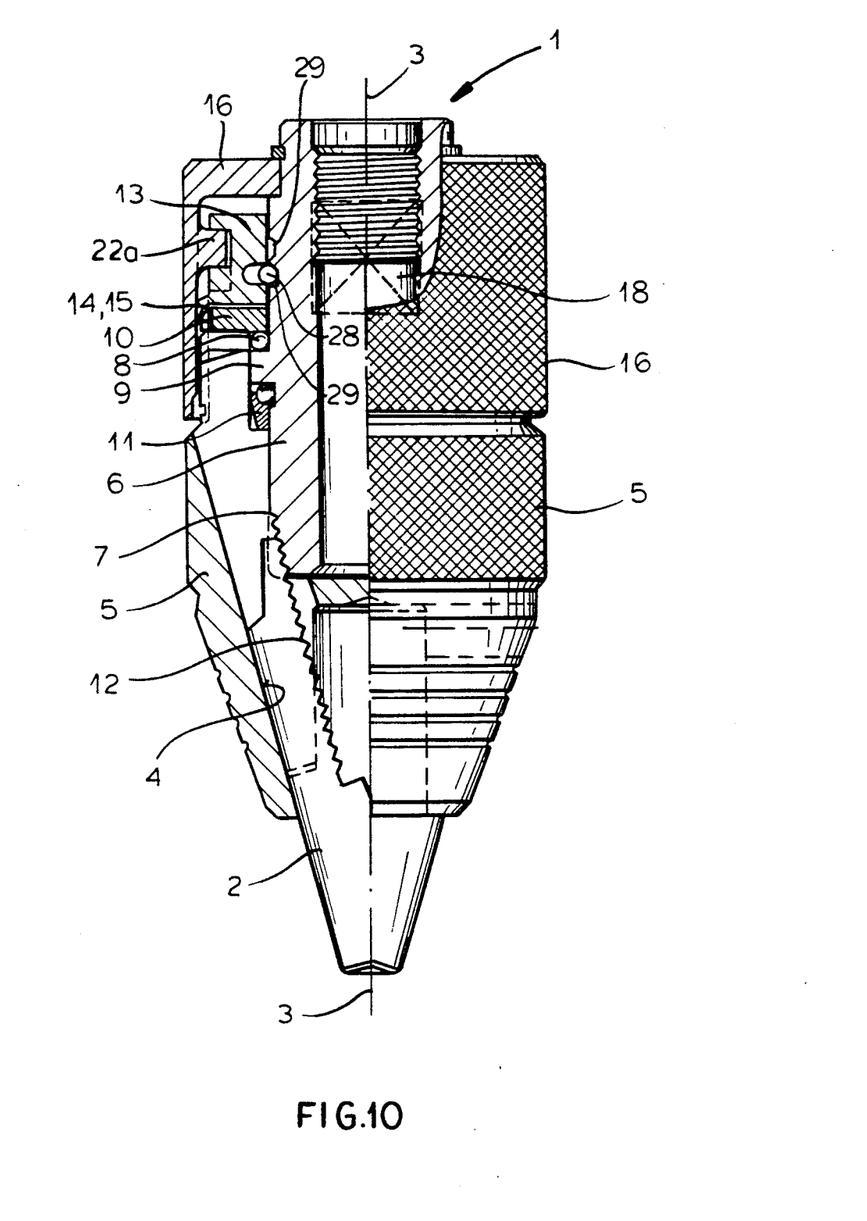
FIG. 10 is an axial section through another chuck according to the invention.
Figure 11:
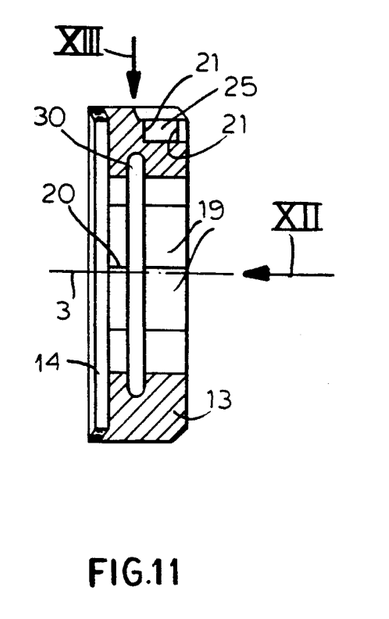
FIG. 11 is an axial section through the locking ring of the chuck of FIG. 10.
Figure 12:
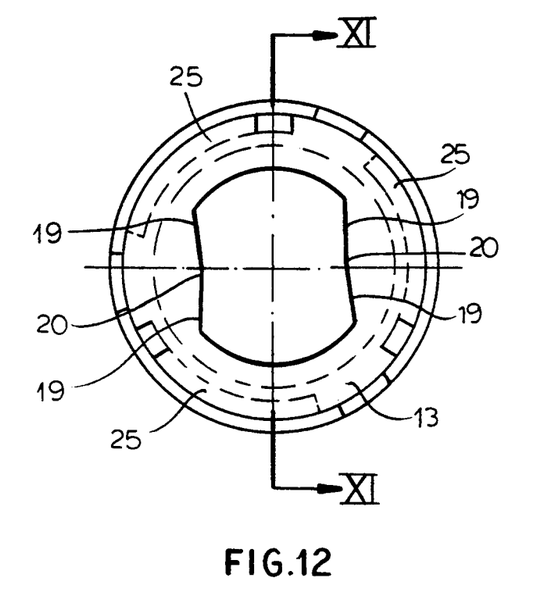
FIGS. 12 and 13 are end and side views taken in the directions of respective arrows XII—XII and XIII—XIII of FIG. 11, line XI—XI of FIG. 12 being the section line for FIG. 11.
Figure 13:
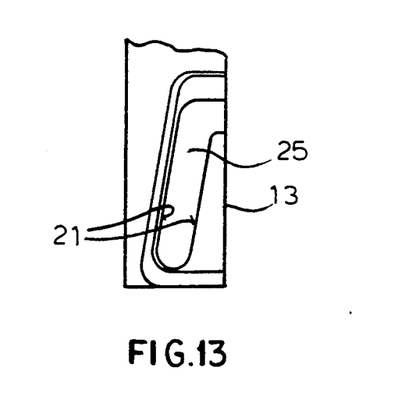

A locking ring 13 shown in detail in FIGS. 4 through 6 has an internal toothing 14 that can mesh with an external toothing 15 of the sleeve 5 to rotationally couple these elements 5 and 13 together. An actuating ring 16 can displace the ring 13 between its axial end positions as indicated by arrow 17 in FIG. 1. The ring 13 is limitedly rotatable on the body 6. To this end the body 6 is formed with two diametrically oppositely facing planar flats 18 that can engage angled planar stop faces 19 formed inside the ring 13 as shown in FIG. 6. The faces 19 extend at obtuse angles to each other, meeting at a center 20 so that the ring 13 can move limitedly angularly on the body 6.

The ring 16 is formed with two pairs of diametrically opposite camming surfaces or ramps 21 that each have an axially forward front end and an axially backward rear end spaced apart by the distance 17, with one such ramp 21 of each pair directed axially forward and the other axially rearward but perfectly parallel to the other ramp 21 of the pair. Furthermore the ring 16 is formed at the ramps 21 with diametrically opposite and axially throughgoing slots or apertures 24 through which extend projections 23 of the ring 13. Two roller pins 22 projecting radially through each such projection 23 ride on the respective ramps 21 so that rotation of the actuating ring 16 will inherently axially displace the locking ring 13.

Figure 1:
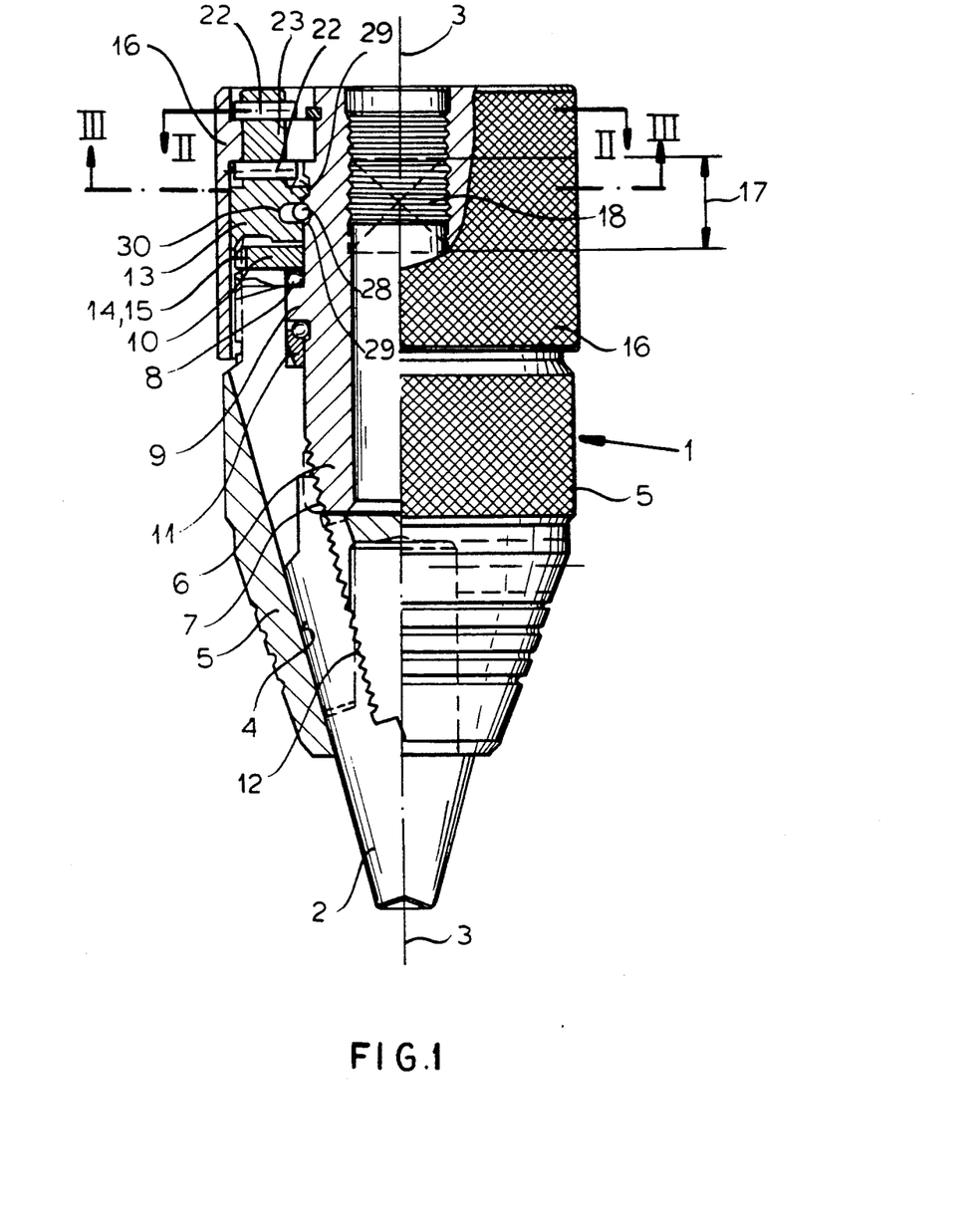
FIG. 1 is an axial section through a drill chuck according to the invention.
Figure 2:
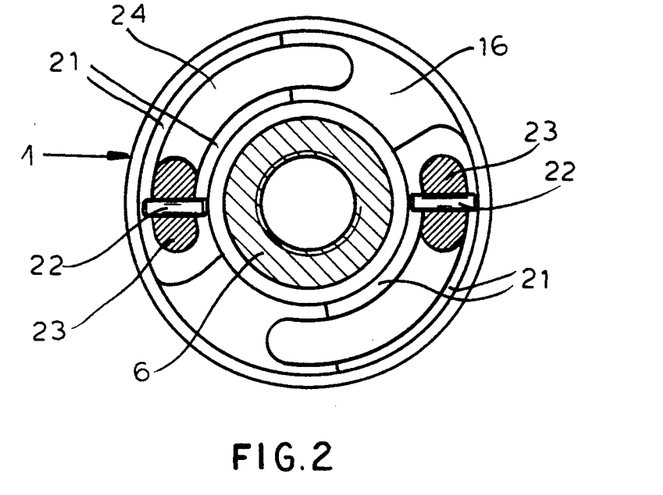
FIGS. 2 and 3 are sections taken along lines II—II and III—III, respectively, of FIG. 1.
Figure 3:
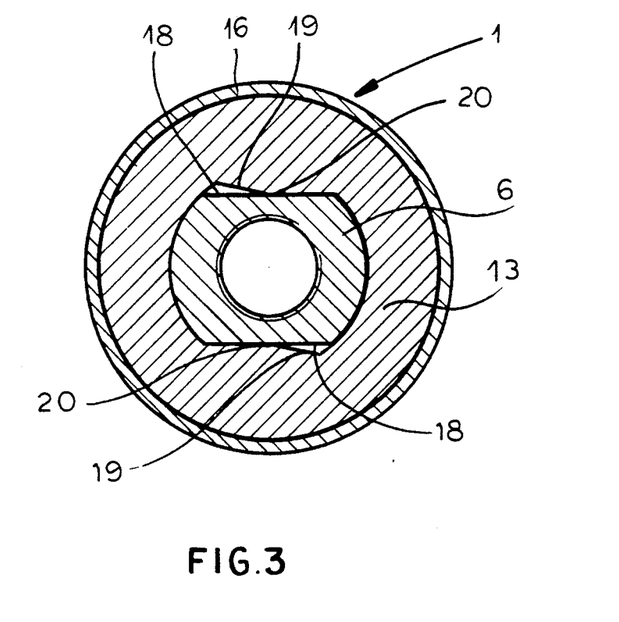

In order to releasably retain the ring 13 in either of its axially offset positions, this ring 13 is formed with a radially inwardly open deep groove 30 holding a split spring ring 28 that can engage in either of two radially outwardly open and axially spaced shallow seat grooves 29 formed in the body 6. Thus this ring 28 snaps into the seats 29 to hold the ring 13 in place in either of its two axially offset end positions.

Thus with this system to adjust the chuck 1 the actuating ring 16 is turned rearward in one direction until it stops. This cams the locking ring 13 rearward to disengage the teeth 14 and 15 from each other and also rotates the ring 13 to its starting position. Once the chuck 1 is adjusted, the actuating ring 16 is rotated forward so as to cam the locking ring 13 forward and engage the teeth 14 and 15 without, however angularly moving the locking ring 13 so that it can still move angularly somewhat on the body 6 as the chuck 1 self tightens The rotation directions for the locking ring 13 correspond to that of the tightening sleeve 5 so that operating it is a natural extension of the rotations for opening and closing the chuck 1.

Figure 14:
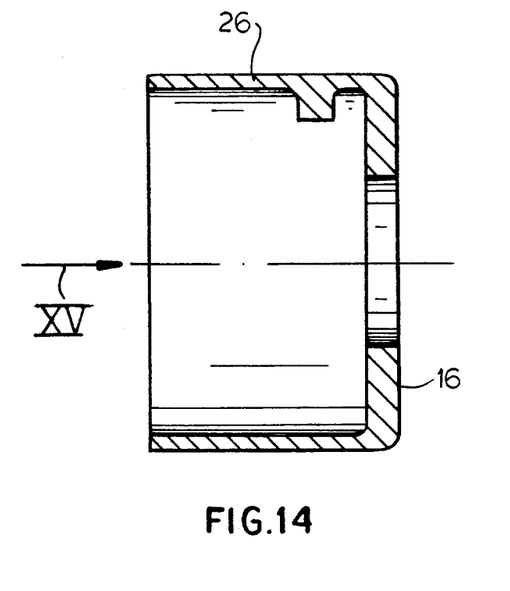
FIG. 14 is an axial section through the actuating ring of the FIG. 10 chuck.
Figure 15:
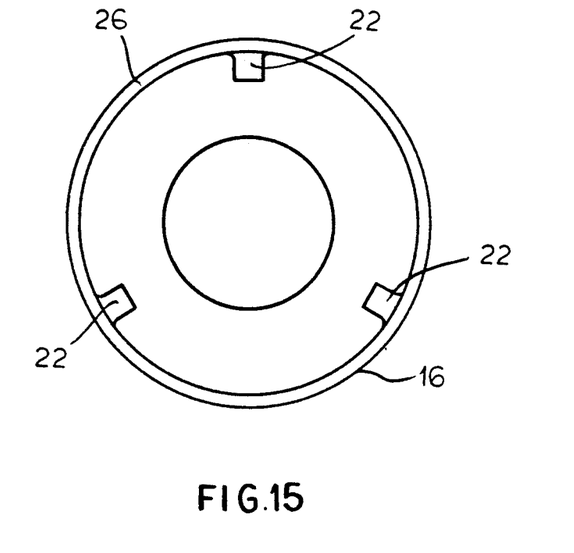
FIG. 15 is an axial end view taken in the direction of arrow XV of FIG. 14.

The chuck 1 of FIGS. 10 through 15 is substantially identical to that of FIGS. 1 through 9 except that the actuating ring 16 is formed with three radially inwardly projecting bumps 22a engaging in angled grooves 25 in the locking ring 13. These grooves 25 form the ramps 21 on which the bumps 22a ride. FIG. 14 also shows how the actuating element 16 has a sleeve-like cylindrical skirt that comes down to cover the rear end of the sleeve 5 and protect the mechanism of the chuck 1.

Figure 16:
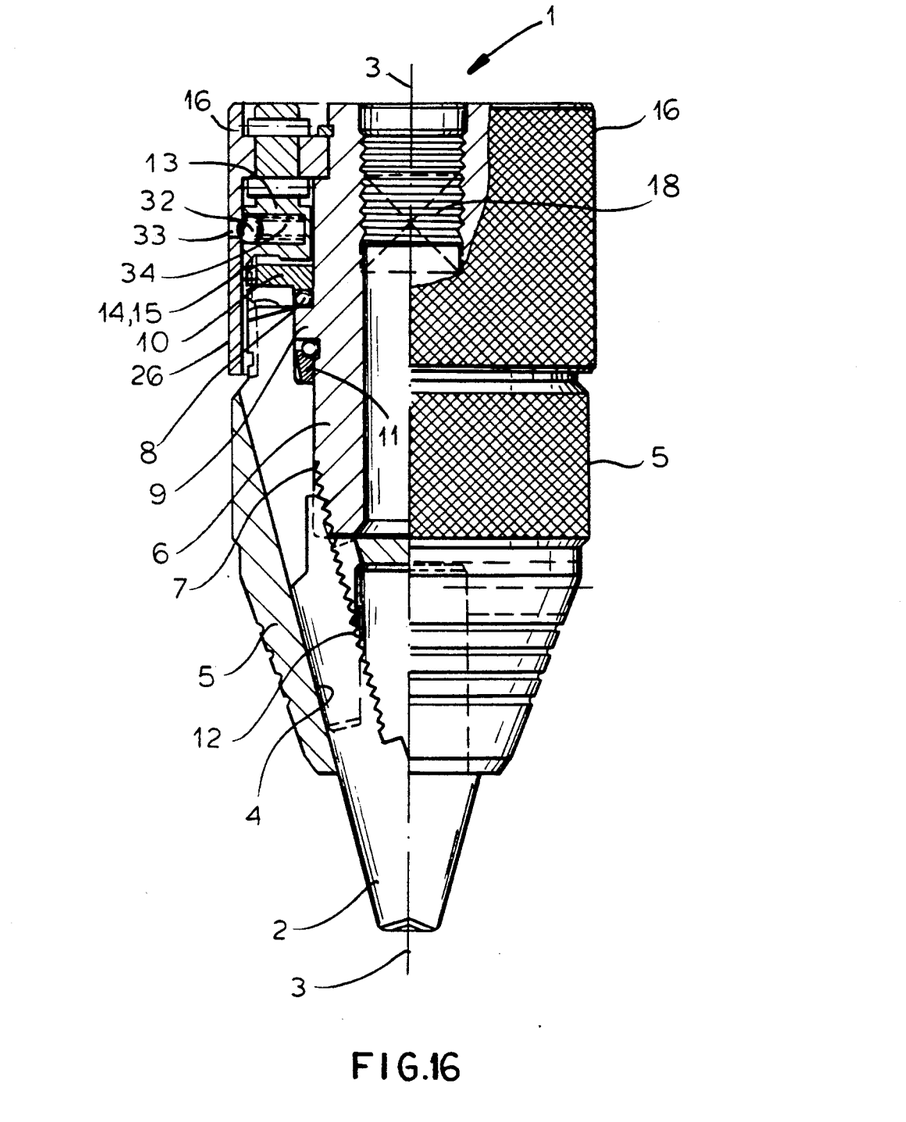
FIGS. 16, 17, and 18 are axial sections through further chucks according to the invention.
Figure 17:
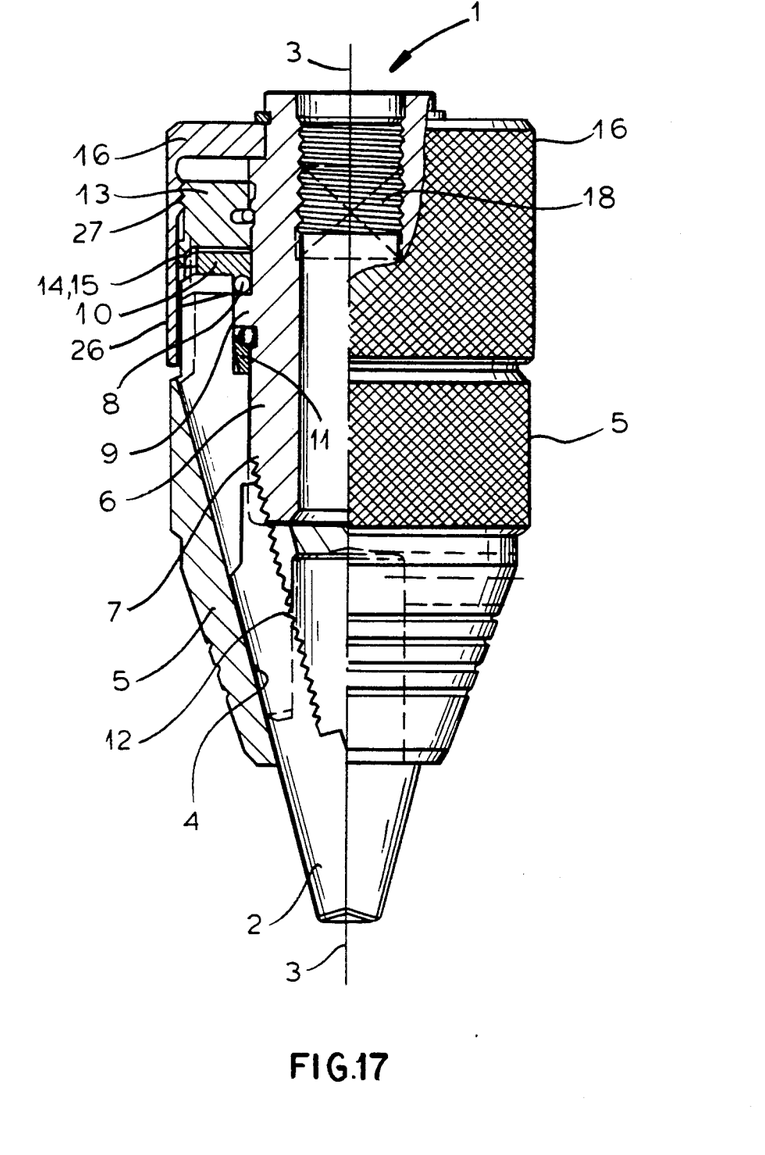

FIG. 16 shows a latching mechanism comprised of a ball 32 urged outwardly in the ring 13 by a spring 34 and engageable in offset seat bores 33 formed in the skirt 26 of the actuating ring 16. Several such balls 32 with respective springs 34 and pairs of seats 33 can be provided, angularly equispaced about the axis 3.

The system of FIGS. 17 and 21 through 24 uses a screwthread 27 formed on the ring 13 and on the ring 16 as the coupling formations between the elements 13 and 16. More particularly, the thread connection 27 is formed as a five-gang internal screwthread 27.1 on the inner surface of the skirt 26 and a plurality of external screwthread portions 27.2 formed on the outer surface of the element 13 and separated by thread-free lands 27.3.

Figure 18:
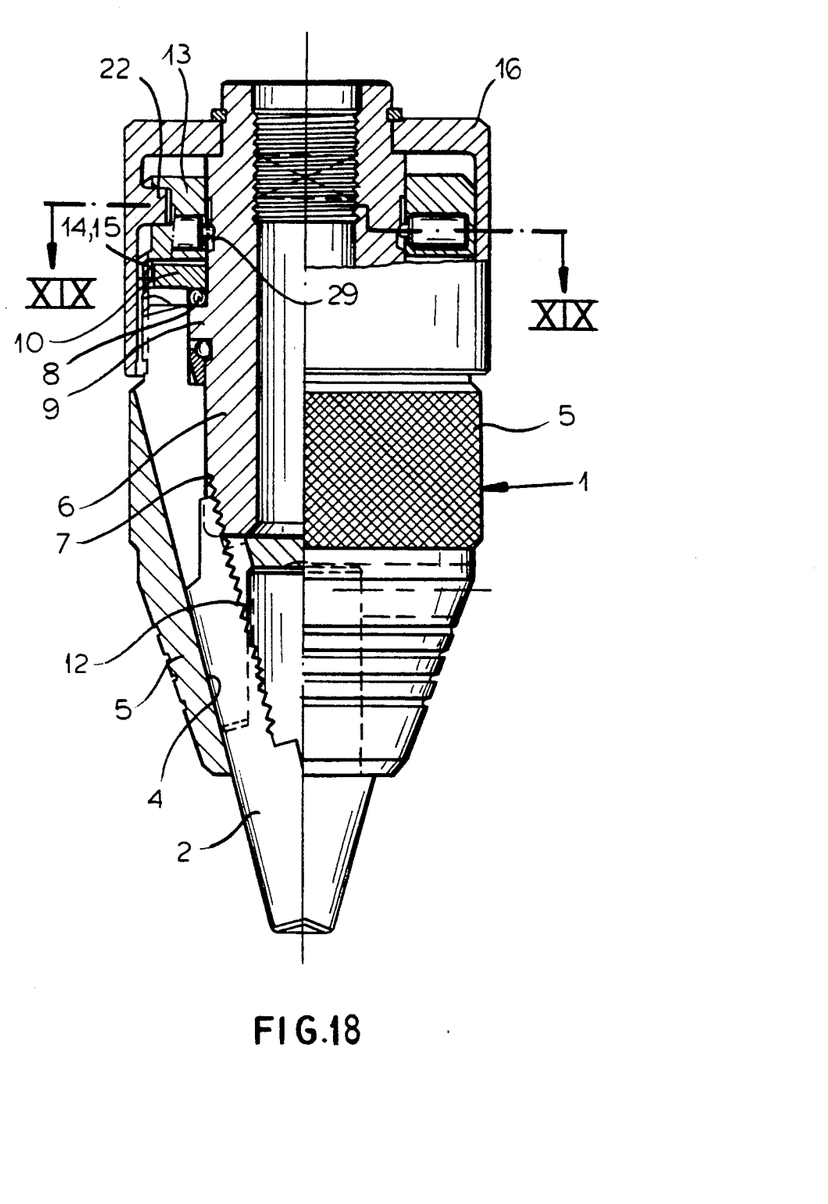
Figure 19:
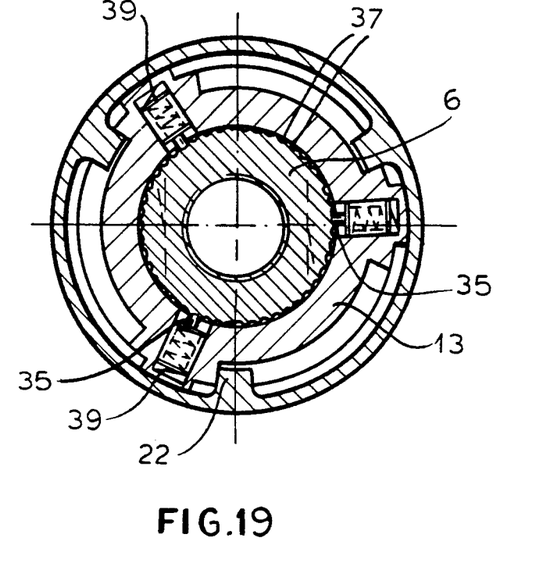
FIG. 19 is a section taken along line XIX—XIX of FIG. 18.
Figure 20:
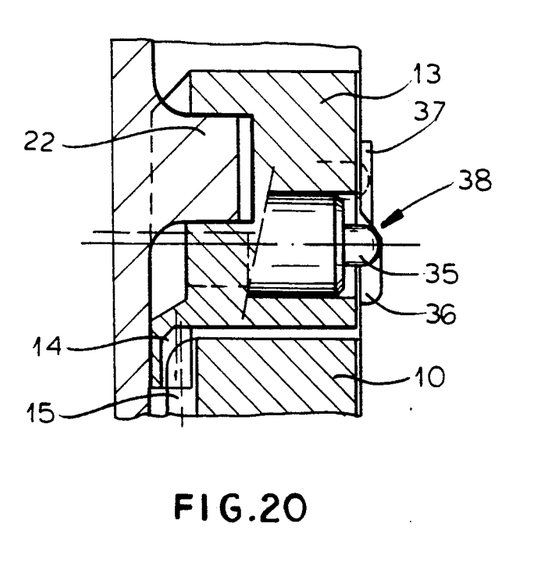
FIG. 20 is a large-scale view of a detail of the FIG. 18 chuck.
Figure 21:
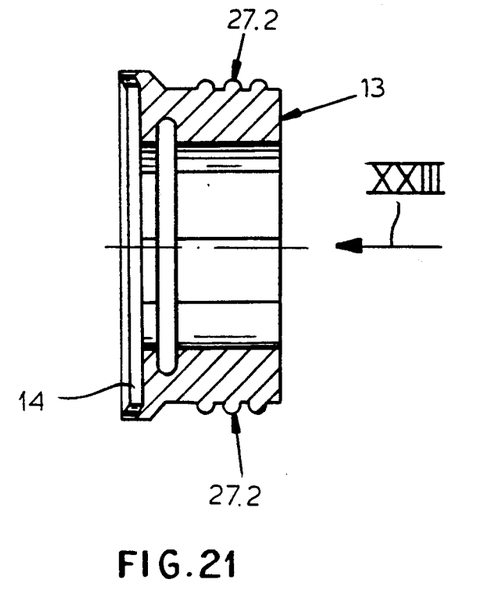
FIG. 21 is an axial section through the locking ring of the FIG. 17 chuck.
Figure 22:
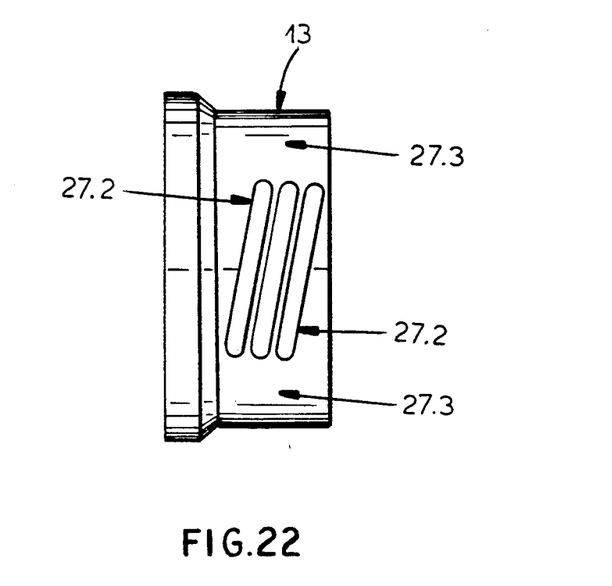
FIG. 22 is a side view of the locking ring of FIG. 21.
Figure 23:
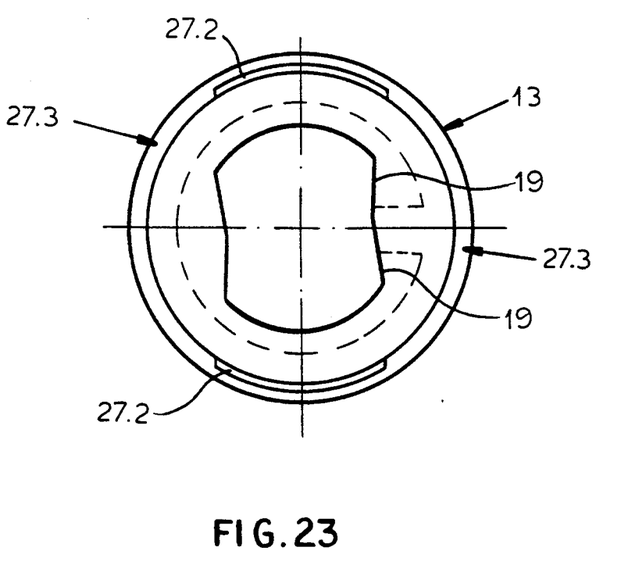
FIG. 23 is an axial end view taken in the direction of arrow XXIII of FIG. 21.
Figure 24:
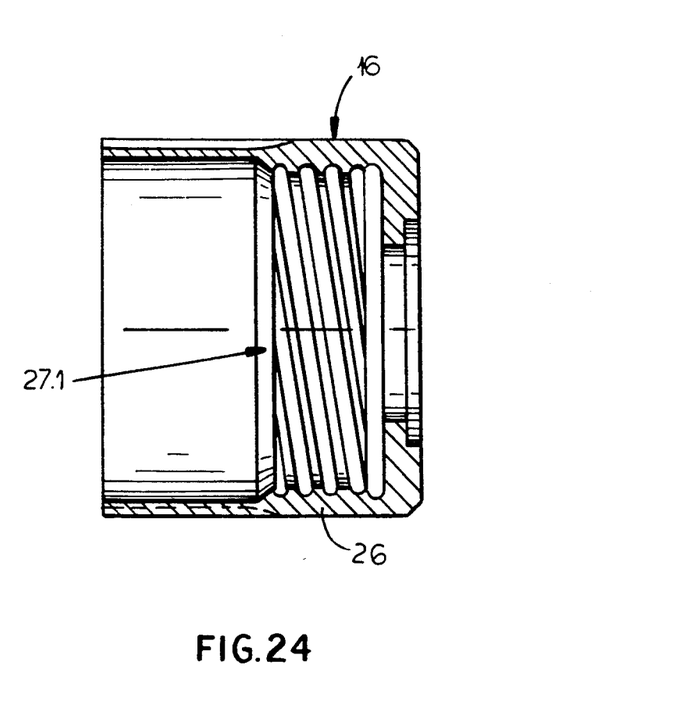
FIG. 24 is an axial section through the actuating ring of FIG. 17.

FIGS. 18 through 20 show an arrangement wherein three angularly equispaced and radially displaceable pins 35 are urged radially inward in respective bores in the ring 13 by respective springs 39. The chuck body 5 is formed with a radially outwardly open groove 36 joined by a frustoconical and rearwardly tapered surface 38 to a region formed with a row of radially outwardly projecting and axially extending teeth 37. Thus when the element 13 is in the forward locking position it can rotate on the body 5, but when it is pulled back in the freeing position with the teeth 14 and 15 disengaged it is rotationally coupled by the pins 35 to the body 5, although it can still be forcibly displaced.

Figure 25:
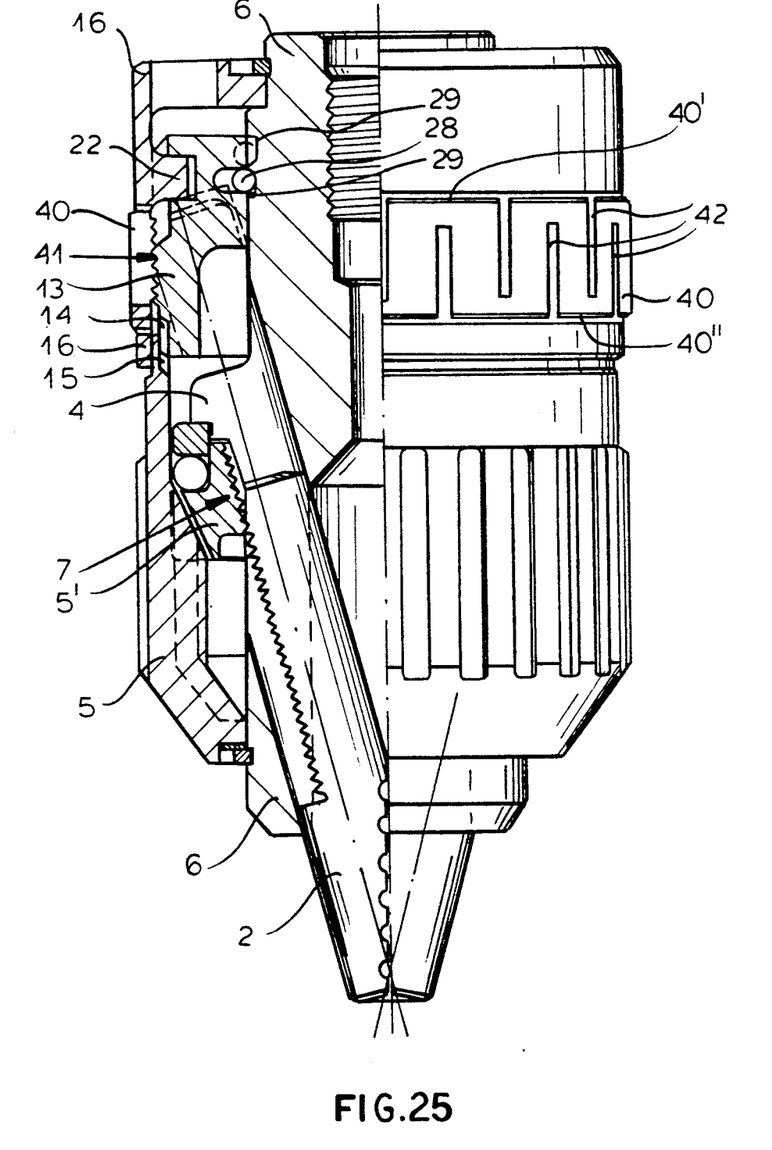
FIG. 25 is an axial section through another drill chuck in accordance with this invention.

FIG. 25 shows a chuck 1 that is similar to that of FIGS. 10 through 15 but that is not self-tightening. It has an adjustment sleeve 5 with an ring 5' that itself is coupled by the screwthreads 7, 12 to the jaws 2. A brake ring 40 is couplable by internal brake surfaces 41 to the outside surface of the ring 13. To permit inward deflection of these surfaces 41 the ring 40 is formed with axial slots 42 opening from opposite axial edges 40' and 40" of the ring 40.

If the ring 40 is gripped tightly it is radially compressed and the surfaces 41 firmly engage the ring 13 to allow it to be pulled back and rotated back to its starting and freeing positions. Then the chuck can be adjusted and once this is complete the ring 16 is pushed forward to lock the chuck.

I claim:

1. A drill chuck comprising:
    a body centered on and rotatable about an axis;
    a plurality of jaws radially displaceable on the body;
    an adjustment sleeve rotatable but not axially displaceable on the body and engaging the jaws for radially displacing same;
    a locking ring rotatable on the body at most through a small acute angle and axially displaceable on the body between a freeing position and a locking position, the locking ring and adjustment sleeve being formed with axially interengageable teeth that are meshed in the locking position of the locking ring and that are out of engagement with each other in the freeing position of the locking ring;
    an actuating ring rotatable but not axially displaceable on the body adjacent the locking ring; and
    means including angled formations between the rings coupling same together for axial movement of the locking ring into its freeing position on rotation of the actuating ring in one rotational sense and for opposite axial movement of the locking ring into its locking position on rotation of the actuating ring in the opposite rotational sense.

2. The drill chuck defined in claim 1 wherein the formations are angled such that the rotation direction of the actuating ring to displace the locking ring into the locking position is opposite to a rotation direction of the sleeve on the body to move the jaws radially together.

3. The drill chuck defined in claim 1 wherein the chuck body and locking ring have mutual axially extending and angularly engageable flats that can move between a position flatly engaging each other and a position forming with each other an angle corresponding to a self-adjustment takeup angle.

4. The drill chuck defined in claim 1 wherein the formations include
    a cam on one of the rings forming an angled ramp, and
    a follower on the other of the rings riding on the ramp.

5. The drill chuck defined in claim 4 wherein the one ring is formed with an angled radially open groove forming the ramp and the other ring is provided with a radial projection engaged in the groove.

6. The drill chuck defined in claim 4 wherein the one ring is formed with a pair of such ramps extending parallel to each other but facing axially oppositely and the follower engages both ramps.

7. The drill chuck defined in claim 6 wherein the follower includes a respective roller engaging each ramp.

8. The drill chuck defined in claim 1 wherein the formation includes
    an external screwthread on one of the rings, and an internal screwthread on the other ring.

9. The drill chuck defined in claim 8 wherein the screwthreads are multiple screwthreads.

10. The drill chuck defined in claim 8 wherein the external screwthread comprises a plurality of screwthread sections alternating angularly with thread-free lands.

11. The drill chuck defined in claim 10 wherein the ends of the screwthread sections are of the same pitch and are aligned with the adjacent screwthread sections.

12. The drill chuck defined in claim 1, further comprising
means for releasably retaining the locking ring in its locking and freeing positions.

13. The drill chuck defined in claim 12 wherein the retaining means includes
a radially displaceable retaining element on one of the rings,
a pair of axially offset radially open seats on the other ring in which the element is engageable, and
spring means for urging the element radially toward the seats.

14. The drill chuck defined in claim 13 wherein the element is a split spring ring and the one ring is formed with a radially open groove in which the ring is seated.

15. The drill chuck defined in claim 13 wherein the element is a radially displaceable pin, one of the seats is a radially inwardly open smooth-floored groove and the other of the seats is a row of radially open and axially extending notches.

16. The drill chuck defined in claim 15 wherein the one ring is formed between the seats with an angled annular surface.

17. The drill chuck defined in claim 15 wherein the one ring has a plurality of such angularly spaced pins axially spaced by a distance substantially smaller than the distance through which the locking ring moves on displacement between its freeing and locking positions.

18. The drill chuck defined in claim 1, further comprising
a grip ring on the actuating ring for directly engaging and holding the locking ring.

19. The drill chuck defined in claim 18 wherein the grip ring is radially compressible, axially coupled to the actuating ring, and has an inner friction surface directly engageable with the locking ring.

20. The drill chuck defined in claim 19 wherein the grip ring is formed with axially oppositely open slots permitting it to be radially compressed.

* * * * *